United States Patent
Yang et al.

(10) Patent No.: US 9,464,639 B2
(45) Date of Patent: Oct. 11, 2016

(54) TURBO CHARGER HAVING COOLING STRUCTURE

(71) Applicants: Hyundai Motor Company, Seoul (KR); Hyundai Wia Corporation, Changwon-si (KR)

(72) Inventors: Sung-jin Yang, Suwon-Si (KR); Seung Yeon Lee, Seoul (KR); Kwang Hwan Kim, Suwon-si (KR); Kyung-wook Jin, Incheon (KR); Ui yeon Park, Pyeongtaek-si (KR); Jun gwan Park, Suwon-si (KR); Gil-beom Lee, Seoul (KR); Kyung-jae Jung, Suwon-si (KR)

(73) Assignees: Hyundai Motor Company, Seoul (KR); Hyundai Wia Corporation, Changwon-si (KR)

( * ) Notice: Subject to any disclaimer, the term of this patent is extended or adjusted under 35 U.S.C. 154(b) by 467 days.

(21) Appl. No.: 14/145,771

(22) Filed: Dec. 31, 2013

(65) Prior Publication Data

US 2015/0086345 A1 Mar. 26, 2015

(30) Foreign Application Priority Data

Sep. 25, 2013 (KR) .......................... 10-2013-0113905

(51) Int. Cl.
| | |
|---|---|
| *F01D 25/12* | (2006.01) |
| *F04D 29/58* | (2006.01) |
| *F01D 25/14* | (2006.01) |
| *F04D 29/40* | (2006.01) |
| *F02C 6/12* | (2006.01) |
| *F04D 29/42* | (2006.01) |

(52) U.S. Cl.
CPC ............ *F04D 29/584* (2013.01); *F01D 25/12* (2013.01); *F01D 25/14* (2013.01); *F02C 6/12* (2013.01); *F04D 29/403* (2013.01); *F04D 29/4206* (2013.01); *F05D 2240/14* (2013.01); *F05D 2260/213* (2013.01)

(58) Field of Classification Search
CPC .. F04D 29/5806; F04D 29/584; F01D 25/12; F01D 25/14; F05D 2260/213
See application file for complete search history.

(56) References Cited

U.S. PATENT DOCUMENTS 3,211,362 A * 10/1965 Laskey ................. F01D 21/006
415/123
6,553,762 B2 * 4/2003 Loffler .................... F01D 9/026
415/203

(Continued)

FOREIGN PATENT DOCUMENTS

JP   2007-46570 A    2/2007
KR   10-2012-0107777 A   10/2012

(Continued)

*Primary Examiner* — Ninh H Nguyen
(74) *Attorney, Agent, or Firm* — Morgan, Lewis & Bockius LLP

(57) ABSTRACT

A turbocharger having a cooling structure may include a center housing on which a shaft is rotatably fitted, a turbine impeller disposed at one end of the shaft, a compressor impeller disposed at the other end of the shaft, a turbine housing fastened to the center housing and covering the turbine impeller such that an exhaust gas flows into the turbine impeller, a compressor housing fastened to the center housing and covering the compressor impeller such that an intake air flows into the compressor impeller, and a coil type heat exchanger formed in a rotational direction of the shaft and in a space between the center housing and the turbine impeller.

9 Claims, 5 Drawing Sheets

(56) References Cited

U.S. PATENT DOCUMENTS 6,764,279 B2* 7/2004 Meshenky .............. F01D 25/12
  165/125
8,365,526 B2* 2/2013 Stiermann ............... F01D 25/14
  60/599

FOREIGN PATENT DOCUMENTS

| KR | 10-2012-0111327 A | 10/2012 |
| WO | WO 2007/104535 A1 | 9/2007 |
| WO | WO 2009/068460 A1 | 6/2009 |
| WO | WO 2010/123761 A2 | 10/2010 |

* cited by examiner

TURBO CHARGER HAVING COOLING STRUCTURE

CROSS-REFERENCE TO RELATED APPLICATION

The present application claims priority of Korean Patent Application Number 10-2013-0113905 filed Sep. 25, 2013, the entire contents of which application are incorporated herein for all purposes by this reference.

BACKGROUND OF INVENTION

1. Field of Invention

The present invention relates to a turbocharger having a cooling structure in which a turbine is rotated by an exhaust gas, a compressor operated by the turbine increases the power of an engine by compressing intake air, and the quality of the exhaust gas is improved.

2. Description of Related Art

Turbochargers have been generally used for internal combustion engines, particularly, for the engine of heavy trucks or ships. Recently, those turbochargers are used for vehicles in order to achieve large power from small engines. Further, the turbochargers improve the quality of an exhaust gas by making fuel more completely burn. The general function and design of the turbochargers are known in the art.

The turbochargers include a turbine rotated by an exhaust gas and a compressor operated to compress intake air by the turbine, in which the turbine and the compressor are connected by a shaft. In the turbochargers, heat at about 200 to 800 degrees transfers to a center housing and the shaft, such that the heat transfer by the radiated heat is minimized by mounting a heat shield structure.

There is a method that can minimize heat transfer by manufacturing a heat shield with at least two material layers and a heat insulator and securing a heat insulation air layer in the heat shield, and studies for minimizing heat transfer between housings are still being conducted. For example, there are WO2010123761A2 and WO2009068460A1 in the conventional art.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a turbocharger having a cooling structure having advantages of improving the durability of a bearing and stabilizing the entire performance by minimizing heat transferring to a shaft and a center housing.

Various aspects of the present invention provide a turbocharger having a cooling structure, which may include a center housing on which a shaft is rotatably fitted, a turbine impeller disposed at one end of the shaft, a compressor impeller disposed at the other end of the shaft, a turbine housing fastened to the center housing and covering the turbine impeller such that an exhaust gas flows into the turbine impeller, a compressor housing fastened to the center housing and covering the compressor impeller such that an intake air flows into the compressor impeller, and a coil type heat exchanger formed in a rotational direction of the shaft and in a space between the center housing and the turbine impeller.

The coil type heat exchanger may include a cooling coil and the cooling coil extends in a rotational direction of the turbine impeller. The cooling coil may be supplied with a coolant from one side of the center housing and may discharge the coolant to the other side of the center housing. A coolant chamber connected with an inlet and an outlet of the coil type heat exchanger may be formed in the center housing.

In some cases, the cooling coil may include a first coil making the coolant flow in the rotational direction of the turbine impeller, a second coil disposed adjacent to the first coil and making the coolant flow in a direction opposite to the rotational direction of the turbine impeller, and a switching coil disposed at a joint of the first coil and the second coil. In other cases, the cooling coil may include an outer coil with one end connected with an inlet of the coil type heat exchanger and the other end connected with an outlet of the coil type heat exchanger, an inner coil disposed inside the outer coil, and a connection coil connecting the outer coil and the inner coil.

The turbocharger may further include a heat shield disposed between the coil type heat exchanger and the turbine impeller and blocks heat.

The diameter of the cooling coil may be about 1 to 5 mm and a coolant may flow in the cooling coil. The coolant may include water, air, oil, or argon.

In order to solve at least some of the problems in the conventional art, in the turbocharger having a cooling structure according to the present invention, the coil type heat exchanger is disposed between the center housing and the turbine impeller and the coolant circulates through the coil type heat exchanger, such that the heat transferring to the center housing and the shaft can be minimized.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
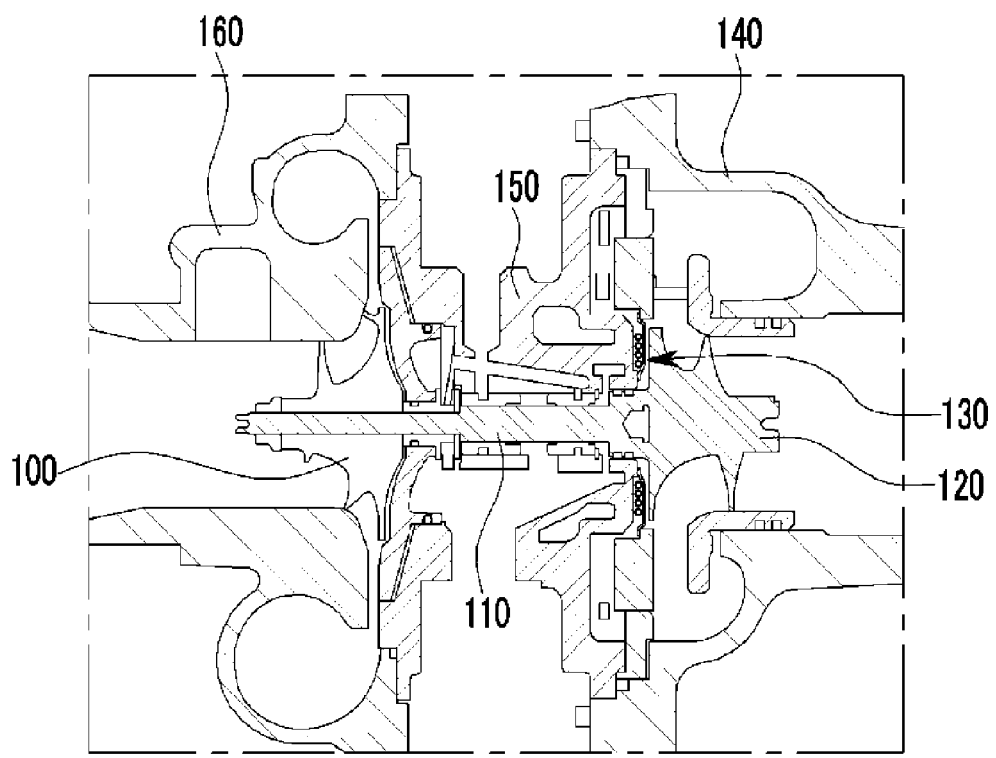
FIG. 1 is a cross-sectional view showing an exemplary turbocharger having a cooling structure according to the present invention.

FIG. 1 is a cross-sectional view showing a turbocharger having a cooling structure according to various embodiments of the present invention. Referring to FIG. 1, a turbocharger having a cooling structure includes a compressor impeller 100, a shaft 110, a turbine impeller 120, a coil type heat exchanger 130, a turbine housing 140, a center housing 150, and a compressor housing 160.

The shaft 110 is disposed through the center of the center housing 150, rotatably through a bearing, the turbine impeller 120 is mounted at one end of the shaft 120, and the compressor impeller 100 is mounted at the other end of the shaft 110.

The turbine housing 140 is mounted on the center housing 150, covering the turbine impeller 120, and supplies and discharges an exhaust gas to the turbine impeller 120. The compressor housing 160 is mounted on the center housing 150, covering the compressor impeller 100, and supplies and discharges intake air to the compressor impeller 100.

The coil type heat exchanger 130 is disposed in a narrow space between the turbine impeller 120 and the center housing 150 and absorbs heat produced therebetween. Accordingly, an increase in temperature of the center housing 150 is limited by the exhaust gas and the lubrication temperature of the bearing is decreased, such that the durability of the entire turbocharger is improved.

Figure 2:
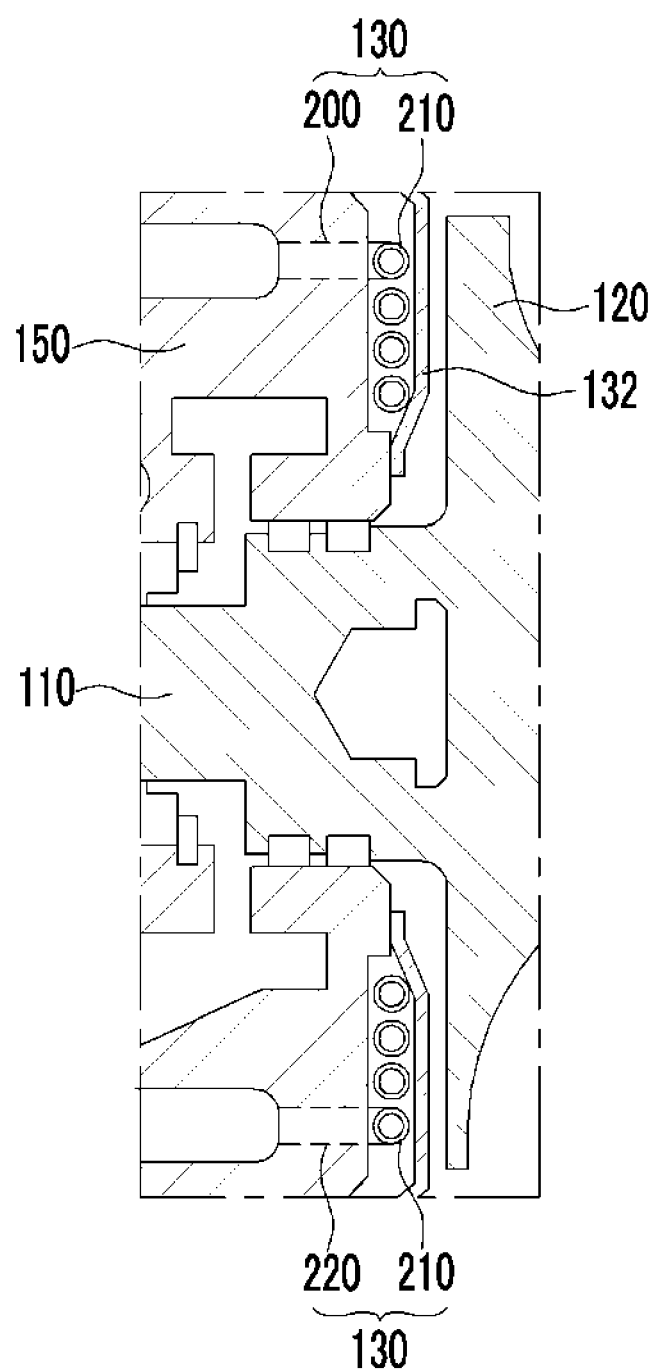
FIG. 2 is a partial detailed cross-sectional view showing an exemplary turbocharger having a cooling structure according to the present invention.

FIG. 2 is a partial detailed cross-sectional view showing the turbocharger having a cooling structure according to various embodiments of the present invention. Referring to FIG. 2, the coil type heat exchanger 130 includes an inlet 200, a cooling coil 210, and an outlet 220, and the inlet 200 and the outlet 220 are connected with a coolant chamber formed in the center housing 150.

The center housing 150 is disposed at one side and a heat shield 132 is disposed at the other side, with the cooling coil 210 therebetween. The heat shield 132 prevents heat from transferring from the turbine impeller 120 to the center housing 150 and protects the coil type heat exchanger 130.

Figure 3:
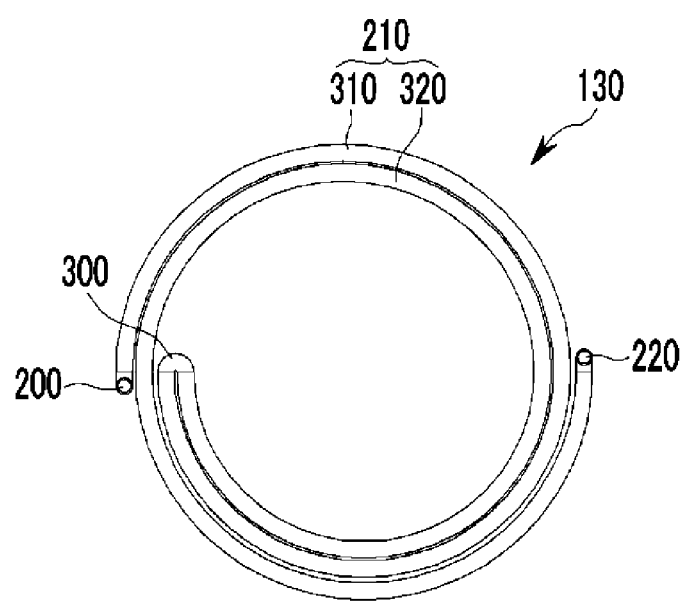
FIG. 3 is a front view showing an exemplary cooling coil for a turbocharger having a cooling structure according to the present invention.

FIG. 3 is a front view showing one type of cooling coils in the turbocharger having a cooling structure according to various embodiments of the present invention. Referring to FIG. 3, the coil type heat exchanger 130 includes the cooling coil 210, the inlet 200, and the outlet 220 and the cooling coil 210 includes a first coil 310, a second coil 320, and a switching coil 300.

The first coil 310 is formed such that a coolant flows clockwise and connected with the inlet 200 and the second coil 320 is connected with the outlet 220, with the other end connected with the other end of the first coil 310 such that the coolant flows counterclockwise. The switching coil 300 that changes the flow of the coolant is disposed at the joint of the first coil 310 and the second coil 320.

As shown in the figure, the first coil 310 and the second coil 320 of the cooling coil 210 are spirally arranged, adjacent to each other toward the center of the shaft 110.

Figure 4:
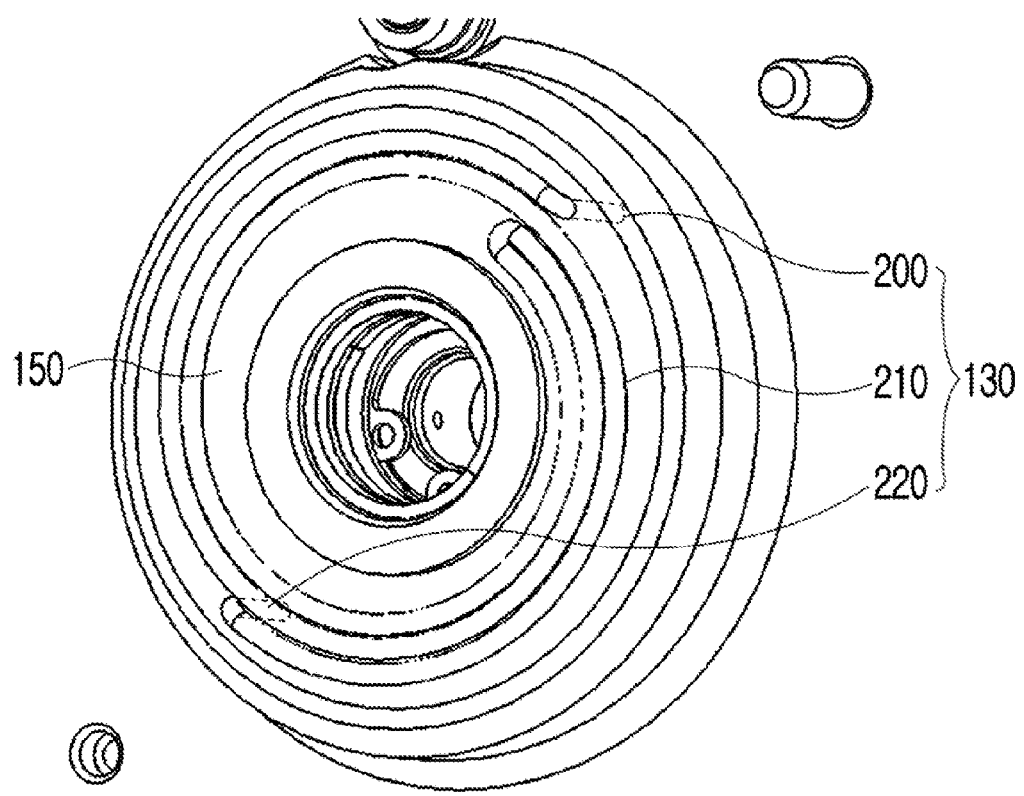
FIG. 4 is a perspective view showing an exemplary turbocharger having a cooling structure according to the present invention which is equipped with a cooling coil.

FIG. 4 is a perspective view showing the turbocharger having a cooling structure according to various embodiments of the present invention which is equipped with a cooling coil. FIG. 4 shows a case when the coil type heat exchanger is disposed on the center housing with the heat shield removed from the status of FIG. 2.

Figure 5:
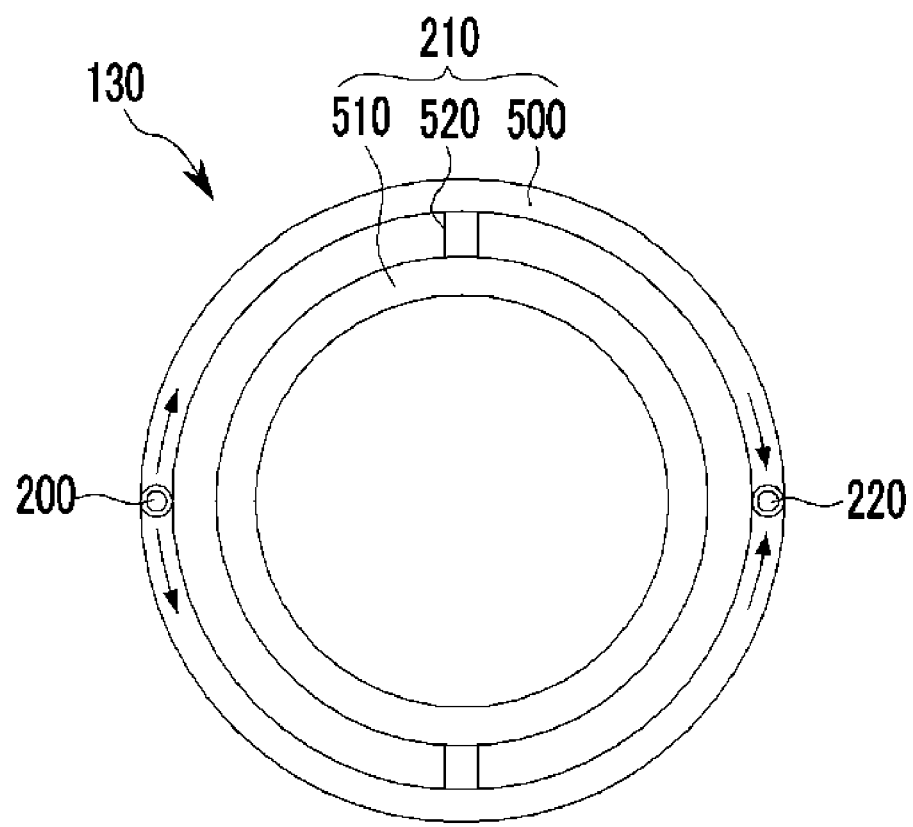
FIG. 5 is a front view showing another exemplary cooling coil for a turbocharger having a cooling structure according to the present invention.

FIG. 5 is a front view showing another type of cooling coils in the turbocharger having a cooling structure according to various embodiments of the present invention.

Referring to FIG. 5, the coil type heat exchanger 130 includes an inlet 200, an outlet 220, a cooling coil 210, and a connection coil 520 and the cooling coil 210 includes an inner coil 510 and an outer coil 500.

The outer coil 500 is connected to the inlet 200 and the outlet 220, the outer coil 500 is disposed at a predetermined distance outside the inner coil 510, and the inner coil 510 and the outer coil 500 are coaxially arranged around the central axis of the shaft 110.

The connection coil 520 connecting the outer coil 500 and the inner coil 510 is further provided. Accordingly, a coolant supplied through the inlet 200 circulates through the outer coil 500, the connection coil 520, the inner coil 510, and the outlet 220.

In various embodiments of the present invention, the diameter of the cooling coil 210 may be in the range of about 1 to 5 mm and the coolant can absorb heat transferring from the turbine impeller 120 to the center housing 150 while flowing in the cooling coil 210. Further, the coolant may include water, air, oil, argon, or the like.

For convenience in explanation and accurate definition in the appended claims, the terms "inner" or "outer", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A turbocharger having a cooling structure, comprising a center housing on which a shaft is rotatably fitted;
a turbine impeller disposed at one end of the shaft;
a compressor impeller disposed at the other end of the shaft;
a turbine housing fastened to the center housing and covering the turbine impeller such that an exhaust gas flows into the turbine impeller;
a compressor housing fastened to the center housing and covering the compressor impeller such that an intake air flows into the compressor impeller; and
a coil type heat exchanger formed in a rotational direction of the shaft and in a space between the center housing and the turbine impeller.

2. The turbocharger of claim 1, wherein the coil type heat exchanger includes a cooling coil and the cooling coil extends in a rotational direction of the turbine impeller.

3. The turbocharger of claim 2, wherein the cooling coil is supplied with a coolant from one side of the center housing and discharges the coolant to the other side of the center housing.

4. The turbocharger of claim 3, wherein a coolant chamber connected with an inlet and an outlet of the coil type heat exchanger is formed in the center housing.

5. The turbocharger of claim 2, wherein the cooling coil includes:
- a first coil making the coolant flow in the rotational direction of the turbine impeller;
- a second coil disposed adjacent to the first coil and making the coolant flow in a direction opposite to the rotational direction of the turbine impeller; and
- a switching coil disposed at a joint of the first coil and the second coil.

6. The turbocharger of claim 2, wherein the cooling coil includes:
- an outer coil with one end connected with an inlet of the coil type heat exchanger and the other end connected with an outlet of the coil type heat exchanger;
- an inner coil disposed inside the outer coil; and
- a connection coil connecting the outer coil and the inner coil.

7. The turbocharger of claim 2, wherein a diameter of the cooling coil is about 1 to 5 mm and a coolant flows in the cooling coil.

8. The turbocharger of claim 7, wherein the coolant includes water, air, oil, or argon.

9. The turbocharger of claim 1, further comprising:
- a heat shield disposed between the coil type heat exchanger and the turbine impeller and blocks heat.

* * * * *